United States Patent [19]

Mochida et al.

[11] Patent Number: 4,798,160
[45] Date of Patent: Jan. 17, 1989

[54] SHIFT-LEVER POSITION INDICATING DEVICE FOR AUTOMATIC POWER TRANSMISSION

[75] Inventors: Haruo Mochida, Kanagawa; Yasushi Asano, Toyohashi, both of Japan

[73] Assignee: Nissan Motor Company, Limited, Japan

[21] Appl. No.: 567,131

[22] Filed: Dec. 30, 1983

Related U.S. Application Data

[63] Continuation of Ser. No. 290,737, Aug. 6, 1981, abandoned.

[30] Foreign Application Priority Data

Aug. 26, 1980 [JP]   Japan ................................ 55-121034

[51] Int. Cl.$^4$ ................................................. G09F 9/00
[52] U.S. Cl. ............................ 116/28.1; 116/DIG. 20
[58] Field of Search .............. 116/DIG. 20, 28.1, 202, 116/307, 310, 282, 288, 327, 328, 322, 323, 324, 256, 334, 335, 336, 337, 255; D12/179; 74/473

[56] References Cited

U.S. PATENT DOCUMENTS

| | | | |
|---|---|---|---|
| 1,789,029 | 1/1931 | Weis | 116/256 |
| 2,672,116 | 3/1954 | Gunderson | 116/DIG. 20 |
| 2,732,905 | 1/1956 | Anderson | 116/DIG. 20 |
| 2,775,134 | 12/1956 | Swenson | 74/473 |
| 3,985,095 | 10/1976 | Nurse | 116/DIG. 20 |
| 4,137,864 | 2/1979 | Lauper | 116/DIG. 20 |

FOREIGN PATENT DOCUMENTS

| | | | |
|---|---|---|---|
| 2288640 | 5/1926 | France | 116/28.1 |
| 52-49356 | 11/1977 | Japan . | |

Primary Examiner—William A. Cuchlinski, Jr.
Attorney, Agent, or Firm—Lane and Aitken

[57] ABSTRACT

A shift-lever position indicating device for indicating selected positions of the shift lever of an automatic power transmission, wherein an indicator plate has carried thereon marks respectively indicating predetermined positions including a parking-gear position of the shift lever and further has light pervious portions respectively located in conjunction with the marks. The light pervious portions located in conjunction with the marks indicative of the positions except for the parking-gear position of the shift lever are arranged in a predetermined relationship while the light pervious portion located in conjunction with the mark indicative of the parking-gear position of the shift lever is located unconformably to the predetermined relationship so as to stand out conspicuously from the other light pervious portions.

8 Claims, 3 Drawing Sheets

SHIFT-LEVER POSITION INDICATING DEVICE FOR AUTOMATIC POWER TRANSMISSION

This application is a continuation, of application Ser. No. 290,737, filed Aug. 6, 1981, now abandoned.

FIELD OF THE INVENTION

The present invention relates to a shift-lever position indicating device for indicated selected positions of a manually-operated shift lever of an automatic power transmission of a power vehicle such as an automotive vehicle.

SUMMARY OF THE INVENTION

In accordance with the present invention, there is provided a shift-lever position indicating device for indicating selected positions of a shift lever of an automatic power transmission system wherein the shift lever is pivotally movable to a plurality of positions including a parking-gear position, comprising a casing structure formed with an elongated slot for permitting the shift lever to move therethrough, the casing structure having an illuminating chamber defined therein, a light source located within the illuminating chamber and operative to emit light in the illuminating chamber, the casing structure including an indicator plate carrying thereon a plurality of marks consisting of a mark indicative of the parking-gear position of the shift lever and a series of marks respectively indicative of the remaining positions of the shift lever, the indicator plate having a plurality of light pervious portions consisting of a light pervious portion located in conjunction with the mark indicative of the parking-gear position of the shift lever and light pervious portions located respectively in conjunction with the marks indicative of the remaining positions of the shift lever, the light pervious portions located in conjunction with the marks indicative of the aforesaid remaining positions of the shift lever being arranged in predetermined relationship in the indicator plate and the light pervious portion located in conjunction with the mark indicative of the parking-gear position of the shift lever being located unconformably to the above mentioned relationship with respect to the remaining light pervious portions, and a pointer element secured to the shift lever and movable in the illuminating chamber, the pointer element having a first light pervious portion movable between the aforesaid light source and the light pervious portion located in conjunction with the mark indicative of the parking-gear position of the shift lever and a second light pervious portion movable between the light source and the above mentioned remaining light pervious portions. The first and second light pervious portions of the pointer element preferably differ in color from each other, and the light pervious portion located in conjunction with the mark indicative of the parking-gear position of the shift lever is preferably larger in measurement than each of the remaining light pervious portions of the indicator plate.

BRIEF DESCRIPTION OF THE DRAWINGS

Drawbacks of prior-art shift-lever position indicating devices and the detailed features and advantages of a shift-lever position indicating device according to the present invention will be understood from the following description taken in conjunction with the accompanying drawings in which like reference numerals designate similar or corresponding members and elements throughout the figures and in which.

DESCRIPTION OF THE DRAWINGS

Figure 1:
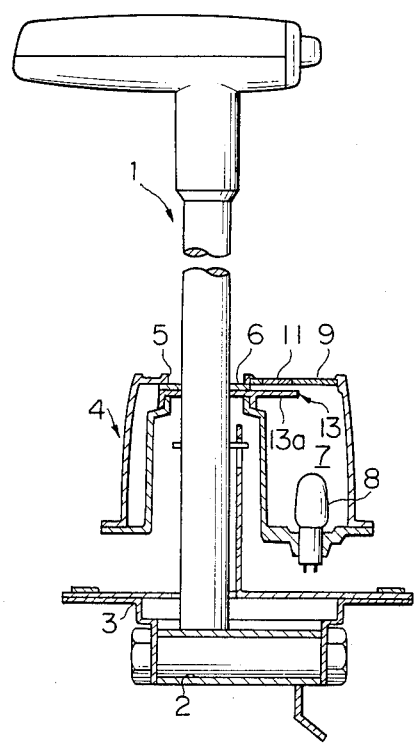
FIG. 1 is a vertical sectional view of a prior-art shift-lever position indicating device of an automatic power transmission system of an automotive vehicle.
Figure 2:
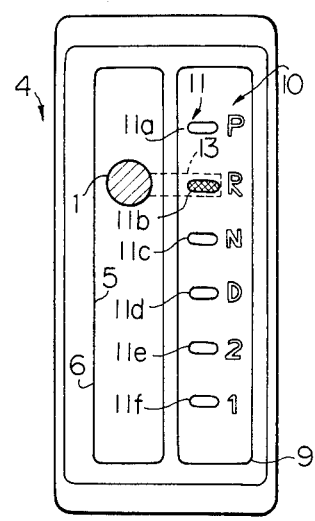
FIG. 2 is a top plan view of the shift-lever position indicating device illustrated in FIG. 1.

Referring to FIGS. 1 and 2 of the drawings, a manually-operated shift lever 1 of an automatic power transmission is pivotally movable about the center axis of a shaft 2 supported by a bracket member 3 secured to, for example, the body structure of an automotive vehicle. A shift-lever position indicating device is provided in combination with such a shift lever 1 and comprises a casing structure 4 fixedly held in position with respect to the bracket member 3. The casing structure 4 has formed at the top thereof an elongated slot 5 for permitting the shift lever 1 to pivotally move therethrough about the center axis of the shaft 2 in, for example, a fore-and-aft direction of the vehicle body structure. The slot 5 is closed by a slider plate 6 secured to and movable with the shift lever 1.

The casing structure 4 has an illuminating chamber 7 defined therein. A source of light is constituted by an electric lamp 8 which projects into the illuminating chamber 7. The lamp 8 is electrically connected to a suitable power source across a suitable switch means though not shown in the drawings and is thus operative to emit light in the illuminating chamber 7. The lamp 8 is usually located at the bottom of the illuminating chamber 7 as shown and is operative to emit light upwardly in the illuminating chamber 7.

The casing structure 4 includes an indicator plate 9 which is provided at the top of the illuminating chamber 7 and which is elongated in parallel with the slot 5 in the casing structure. As shown in FIG. 2, the indicator plate 9 has carried thereon a series of marks 10 respectively indicative of predetermined angular positions to which the shift lever 1 is pivotally movable with respect to the bracket member 3 and accordingly to the body structure of the vehicle. As is well known in the art, the shift lever 1 is connected to or engaged by a manual transmission shift valve incorporated in the hydraulic control system (not shown) of the automatic power transmission. Thus, the predetermined angular positions of the shift lever 1 include a parking-gear position "P", a reverse-drive position "R", a neutral gear position "N", an automatic forward-drive range position "D", a manual second forward-drive position "2" and a manual first forward-drive position "1". The marks 10 carried on the indicator plate 9 are indicative of these positions "P", "R", "N", "D", "2" and "1", respectively, of the shift lever 1 and accordingly of the manual transmission shift valve of the hydraulic control system. In the prior-art lever-position indicating device illustrated in FIGS. 1 and 2, these marks 10 are arranged in line in parallel with the slot 5 in the casing structure 4.

The indicator plate 9 further has a plurality of light pervious portions respectively constituted by windows 11 formed in the indicator plate 9. These windows 11 are arranged also in parallel with the slot 5 in the casing structure 4 and are located respectively aside the individual marks 10. Thus, the windows 11 consist of windows 11a, 11b, 11c, 11d, 11e, and 11f which are discrete from one another and which are respectively allocated to the marks 10 indicative of the positions "P", "R", "N", "D", "2" and "1" of the shift lever 1.

Figure 3:
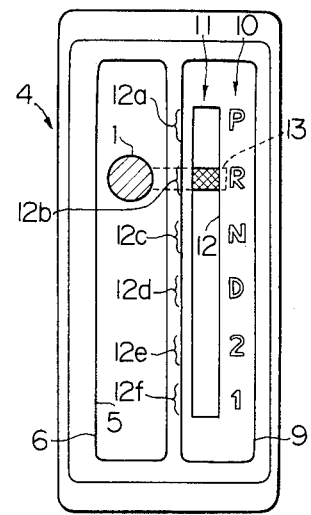
FIG. 3 is a view similar to FIG. 2 but shows a modification of the prior-art shift-lever position indicating device illustrated in FIGS. 1 and 2.

In another type of known shift-lever position indicating device as illustrated in FIG. 3, the light pervious portions of the indicator plate 9 are constituted by a single, continuous window 12 which is elongated in parallel with the slot 5 in the casing structure 4. The window 12 has window portions 12a, 12b, 12c, 12d, 12e and 12f which are continuous to one another and which are located aside the marks 10 indicative of the positions "P", "R", "N", "D", "2" and "1", respectively, of the shift lever 1.

Each of the prior-art shift-lever position indicating devices illustrated in FIGS. 1 to 3 further comprises a pointer element 13 secured to and movable with the shift lever 1. The pointer element 13 projects laterally into the illuminating chamber 7 and has a colored, transparent portion 13a movable between the lamp 8 and the series of windows 11 (FIG. 2) or the elongated window 12 (FIG. 3) in the indicator plate 9.

When the shift lever 1 is moved into any of the positions "P", "R", "N", "D", "2" and "1" thereof, the pointer element 13 has its colored transparent portion 13a located between the lamp 8 and one of the windows 11a to 11f (FIG. 2) or the window portions 12a to 12f (FIG. 3) aside the mark 10 indicative of the particular position into which the shift lever 1 is moved. The light emanating from the lamp 8 is thus partially passed through the colored transparent portion 13a of the pointer element 13 so that the window or the window portion shaded by the pointer element 13 is illuminated in color, thereby indicating the position into which the shift lever 1 is moved.

When an automotive vehicle is to be parked, it is important to have the shift lever moved to the parking position thereof so as to neutralize the power transmission with the transmission output shaft held in a locked condition. If the shift lever is inadvertently held in, for example, the reverse drive position during parking of the vehicle, an unforeseen accident might be caused when the vehicle is to be started after the parking. In order to avoid such an accident, it is desirable that the mark indicative of the parking-gear position of the shift lever and the window or the window portion associated with the particular mark be arranged in such a manner as to stand out clearly from the remaining marks and windows or window portions. In each of the prior-art shift-lever position indicating devices illustrated in FIGS. 1 to 3, however, all of the marks 10 and all of the windows 11 or the window portions 12a to 12f are arranged in line so that the mark indicative of the parking position "P" of the shift lever 1 and the window 11a or window portion 12a associated with the particular mark are not conspicuously distinguished from the other marks and windows or window portions.

The present invention contemplates provision of an improved shift-lever position indicating device in which the mark indicative of the parking-gear position of the shift lever and the window or window portion associated with the particular mark are arranged in such a manner that they can be visually distinguished clearly and conspicuously from the other marks and windows or window portions.

DESCRIPTION OF THE EMBODIMENTS

FIGS. 4 to 7 of the drawings show some embodiments of a shift-lever position indicating device according to the present invention to accomplish such a purpose. Each of the embodiments herein shown is similar in basic construction to the prior-art shift-lever position indicating device illustrated in FIG. 1.

Thus, the members and elements designated by the same reference numerals and characters as those used in FIG. 1 are respectively similar in construction and arrangement to the members and elements denoted by the particular numerals and characters in FIG. 1.

In each of the embodiments illustrated in FIGS. 4 to 7, the indicator plate 9 forming part of the casing structure 4 has carried thereon a plurality of marks 14 respectively indicative of the previously mentioned positions "P", "R", "N", "D", "2" and "1" of the shift lever 1. These marks 14 consist of a mark 14a indicative of the parking position "P" of the shift lever 1 and a series of marks 14b, 14c, 14d, 14e and 14f respectively indicative of the reverse-drive position "R", the neutral-gear position "N", the automatic forward-drive range position "D", the manual second forward-drive position "2" and the manual first forward-drive position "1". The indicator plate 9 in each of the embodiments shown in FIGS. 4 to 7 further has light pervious portions 15 which consist of a light pervious portion 15a located in conjunction with the mark 14a indicative of the parking-gear position "P" and light pervious portions 15b, 15c, 15d, 15e and 15f which are located respectively in conjunction with the marks 14b, 14c, 14d, 14e and 14f indicative of the positions "R", "N", "D", "2" and "1" of the shift lever 1.

The light pervious portions 15b to 15f located in conjunction with the marks 14b to 14f, respectively, are arranged in a predetermined relationship in the indicator plate 9. On the other hand, the light pervious portion 15a located in conjunction with the mark 14a indicative of the parking-gear position "P" of the shift lever 1 is located unconformably to such a relationship among the light pervious portions 15b to 15f. In each of the embodiments illustrated in FIGS. 4 to 8, the above mentioned relationship among the light pervious portions 15b to 15f is such that the portions 15b to 15f are arranged in line in parallel with the slot 5 in the casing structure 4. The light pervious portion 15a located in conjunction with the mark 14a indicative of the parking-gear position "P" in particular is offset from the series combination of the remaining light pervious portions 15b to 15f laterally of the indicator plate 9. Furthermore, the marks 14 indicative of the positions "P", "R", "N", "D", "2" and "1" of the shift lever 1 are arranged respectively aside the light pervious portions 15 arranged in the above described manner. The marks 14b to 14f indicative of the positions except for the parking-gear position "P" of the shift lever are, thus, arranged in line alongside the series combination of the light pervious portions 15b to 15f respectively associated therewith. The mark 14a indicative of the parking-gear position "P" of the shift lever 1 is offset from the series combination of the remaining marks 14b to 14f and is located in line with the series combination of the light pervious portions 15b to 15f. Likewise, the light pervious portion 15a associated with the particular mark 14a is offset from the series combination of the remaining light pervious portions 15b to 15f and is located in line with the series combination of the marks 14b to 14f.

Figure 4:
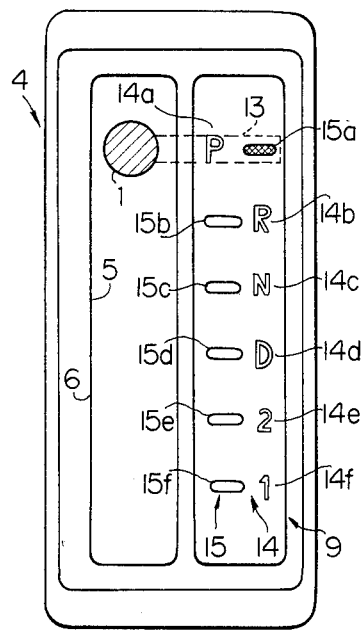
FIG. 4 is a top plan view of an embodiment of a shift-lever position indicating device according to the present invention.
Figure 5:
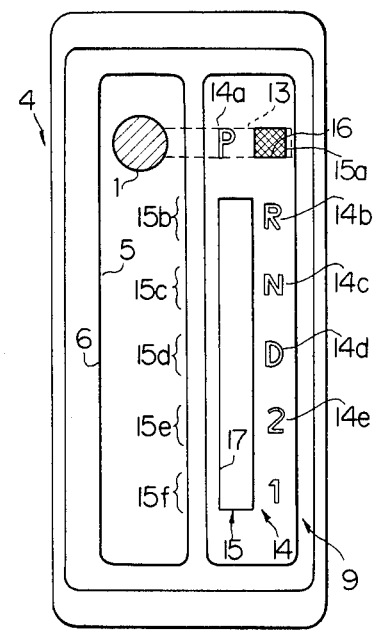
FIG. 5 is a top plan view of a modification of the embodiment illustrated in FIG. 4.

In the embodiment illustrated in FIG. 4 in particular, the light pervious portions 15 are constituted by windows formed in the indicator plate 9 and discrete from each other. On the other hand, the light pervious portions 15 in the embodiment of FIG. 5 are constituted by first and second windows 16 and 17 formed in the indicator plate 9. The first window 16 in its entirety constitutes the light pervious portion 15a, while the second window 17 is elongated in parallel with the slot 5 in the casing structure 4 and has window portions respectively constituting the light pervious portions 15b to 15f. Thus, the light pervious portions 15b to 15f in the embodiment of FIG. 5 are continuous to one another and are discrete from the light pervious portion 15a.

Figure 6:
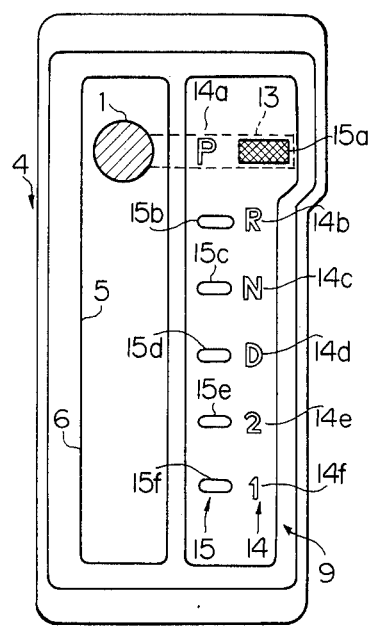
FIG. 6 is a top plan view of another embodiment of a shift-lever position indicating device according to the present invention.
Figure 7:
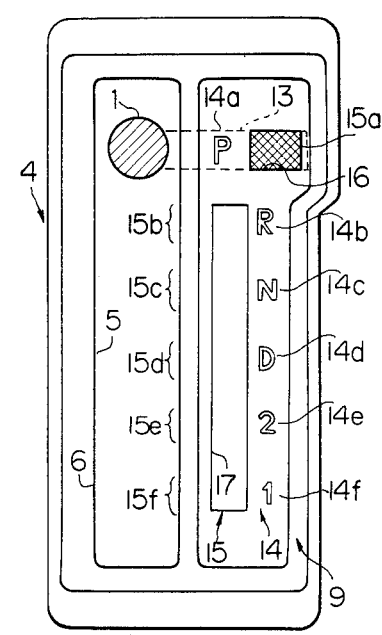
FIG. 7 is a top plan view of a modification of the embodiment illustrated in FIG. 6.

The arrangement of the marks 14 and the light pervious portions 15 in the embodiment of FIG. 6 is similar to that in the embodiment of FIG. 4 except in that the light pervious portion 15a or the window constituting the portion 15a is larger in measurement than each of the other light pervious portions 15b to 15f or the windows respectively constituting the portions 15b to 15f. Likewise, the arrangement of the marks 14 and the light pervious portions 15 in the embodiment of FIG. 7 is similar to that in the embodiment of FIG. 5 except in that the light pervious portion 15a or the window constituting the portion 15a is larger in measurement than each of the other light pervious portions 15b to 15f or the window portions respectively constituting the portions 15b to 15f. Thus, the light pervious portion 15a in each of the embodiments illustrated in FIGS. 6 and 7 stands out more clearly from the other light pervious portions 15b to 15f than the light pervious portion 15a in each of the embodiments of FIGS. 4 and 5 does.

Each of the windows or window portions of the indicator plate 9 in each of the embodiments hereinbefore described may be constituted by a slot formed in the indicator plate 9 or a transparent or translucent portion provided in the plate 9.

Figure 8:
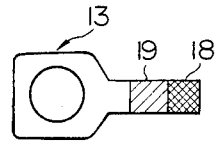
FIG. 8 is a plan view of a pointer element forming part of each of the embodiments illustrated in FIGS. 4 and 5, respectively.

The pointer element 13 included in the shift-lever position indicating device according to the present invention has first and second light pervious portions 18 and 19 which are contiguous with each other as shown in FIG. 8 of the drawings and which project into the illuminating chamber formed in the casing structure as indicated partially by dotted lines in each of FIGS. 4 to 7. The first light pervious portion 18 of the pointer element 13 is movable along the series combination of the light pervious portion 15a and the marks 14b to 14f on the indicator plate 9 and is, thus, movable between the light pervious portion 15a and the light source provided in the illuminating chamber in the casing structure 4. The second light pervious portion 19 of the pointer element 13 is movable along the series combination of the mark 14a and the pervious portions 15b to 15f in the indicator plate 9 and is thus movable between the light source in the illuminating chamber and the series combination of the light pervious portions 15b to 15f in the indicator plate 9.

The first and second light pervious portions 18 and 19 of the pointer element 13 are colored in different colors. When the shift lever 1 is held in the parking-gear position "P" thereof, the light pervious portion 15a of the indicator plate 9 is shaded by the first light pervious portion 18 of the pointer element 13 and is illuminated in the color of the first light pervious portion 18. When, on the other hand, the shift lever 1 is held in any of the positions except for the parking-gear position "P" thereof, one of the light pervious portions 15b to 15f of the indicator plate 9 is shaded by the second light pervious portion 19 of the pointer element 13 and is illuminated in the color of the second light pervious portion 19. Thus, the light pervious portion 15a located in conjunction with the mark 14a indicative of the parking-gear position "P" of the shift lever 1 is illuminated in a color different from the color in which the other light pervious portions 15b to 15f in the indicator plate 9 are to be illuminated, enabling a viewer of the shift-lever indicating device to visually recognize the parking-gear position "P" of the shift lever 1 more clearly than the other positions of the shift lever 1.

When the window constituting the light pervious portion 15a in the indicator plate 9 is formed by a transparent or translucent portion provided in the plate 9, the particular portion of the indicator plate 9 may also be colored if desired. In this instance, the light pervious portion 15a is illuminated in a color resulting from the mixture of the color of the light pervious portion 15a and the color of the first light pervious portion 18 of the pointer element 13.

What is claimed is:

1. A shift-lever position indicating device for indicating selected positions of a shift lever of an automatic power transmission system wherein said shift lever is pivotally movable to a plurality of positions including a parking-gear position, comprising a casing structure formed with an elongated slot for permitting the shift lever to move therethrough, the casing structure having an illuminating chamber defined therein, a light source located within said illuminating chamber and operative to emit light in the illuminating chamber, said casing structure including an indicator plate carrying thereon a mark indicative of said parking-gear position of said shift lever and a series of marks respectively indicative of the remaining positions of the shift lever, said indicator plate having a light pervious portion located in conjunction with the mark indicative of the parking-gear position of the shift lever and light pervious portions located respectively in conjunction with the marks indicative of said remaining positions of the shift lever, the light pervious portions located in conjunction with the marks indicative of said remaining positions of the shift lever being arranged in a predetermined relationship in said indicator plate and the light pervious portion located in conjunction with the mark indicative of the parking-gear position of the shift lever being located unconformably to said relationship with respect to the remaining light pervious portions such that said remaining portions are disposed in a line and said and said light pervious portion located in conjunction with the mark indicative of the parking-gear position of the shift lever is offset from said line, and a pointer element secured to said shift lever and movable in said illuminating chamber, the pointer element having a first light pervious portion movable between said light source and said light pervious portion located in conjunction with the mark indicative of the parking-gear position of the shift lever and a second light pervious portion movable between said light source and said remaining light pervious portions, the first and second light pervious portions differing in color from each other.

2. The shift-lever position indicating device as set forth in claim 1, wherein each of said marks are in the form of letters or numbers, and the light pervious portion located in conjunction with the mark indicative of the parking-gear position of the shift lever differs in configuration from said letters or numbers and from each of the remaining light pervious portions of said indicator plate.

3. The shift-lever position indicating device as set forth in claim 1, wherein the light pervious portion located in conjunction with the mark indicative of the parking-gear position of the shift lever is larger in measurement than each of the remaining light pervious portions of said indicator plate.

4. A shift-lever position indicating device for indicating selected positions of a shift lever of an automatic power transmission system wherein said shift lever is pivotally movable to a plurality of positions including a parking-gear position, comprising a casing structure formed with an elongated slot for permitting the shift lever to move therethrough, the casing structure having an illuminating chamber defined therein, a light source located within said illuminating chamber and operative to emit light in the illuminating chamber, said casing structure including an indicator plate carrying thereon a mark indicative of said parking-gear position of said shift lever and a series of marks respectively indicative of the remaining positions of the shift lever said indicator plate having a light pervious portion located in conjunction with the mark indicative of the parking-gear position of the shift lever and light pervious portions located respectively in conjunction with the marks indicative of said remaining positions of the shift lever, each of said marks being in the form of letters or numbers, and the light pervious portion located in conjunction with the mark indicative of the parking-gear position of the shift lever differing in configuration from said letters or numbers and from each of the remaining light pervious portions of said indicator plate, the light pervious portions located in conjunction with the marks indicative of said remaining positions of the shift lever being arranged in a predetermined relationship in said indicator plate and the light pervious portion located in conjunction with the mark indicative of the parking-gear position of the shift lever being located unconformably to said relationship with respect to the remaining light pervious portions such that said remaining portions are disposed in a line and said light pervious portion located in conjunction with the mark indicative of the parking-gear position of the shift lever is offset from said line, and a pointer element secured to said shift lever and movable in said illuminating chamber, the pointer element having a first light pervious portion movable between said light source and said light pervious portion located in conjunction with the mark indicative of the parking-gear position of the shift lever and a second light pervious portion movable between said light source and said remaining light pervious portions, the first and second light pervious portions differing in color from each other.

5. A shift-lever position indicating device for indicating selected positions of a shift lever of an automatic power transmission system wherein said shift lever is pivotally movable to a plurality of positions including a parking-gear position, comprising a casing structure formed with an elongated slot for permitting the shift lever to move therethrough, the casing structure having an illuminating chamber defined therein, a light source located within said illuminating chamber and operative to emit light in the illuminating chamber, said casing structure including an indicator plate carrying thereon a mark indicative of said parking-gear position of said shift lever and a series of marks respectively indicative of the remaining positions of the shift lever, said indicator plate having a light pervious portion located in conjunction with the mark indicative of the parking-gear position of the shift lever and light pervious portions located respectively in conjunction with the marks indicative of said remaining positions of the shift lever, the light pervious portions located in conjunction with the marks indicative of said remaining positions of the shift lever being arranged in a predetermined relationship in said indicator plate and the light pervious portion located in conjunction with the mark indicative of the parking-gear position of the shift lever being located uncomfortably to said relationship with respect to the remaining light pervious portions such that said remaining portions are disposed in a line and said light pervious portion located in conjunction with the mark indicative of the parking-gear position of the shift lever is offset from said line, said shift lever being pivotally movable about the center axis of a shaft such that said lever moves through said plurality of positions in a direction parallel to said line in which said remaining portions are disposed, and a pointer element secured to said shift lever and movable in said illuminating chamber, the pointer element having a first light pervious portion movable between said light source and said light pervious portion located in conjunction with the mark indicative of the parking-gear position of the shift lever and a second light pervious portion movable between said light source and said remaining light pervious portions, the first and second light pervious portions differing in color from each other.

6. The shift-lever position indicating device as set forth in claim 5, wherein each of said marks are in the form of letters or numbers, and the light pervious portion located in conjunction with the mark indicative of the parking-gear position of the shift lever differs in configuration from said letters or numbers and from each of the remaining light pervious portions of said indicator plate.

7. The shift-lever position indicating device as set forth in claim 5, wherein the light pervious portion located in conjunction with the mark indicative of the parking-gear position of the shift lever is larger in measurement than each of the remaining light pervious portions of said indicator plate.

8. A shift-lever position indicating device for indicating selected positions of a shift lever of an automatic power transmission system wherein said shift lever is pivotally movable to a plurality of positions including a parking-gear position, comprising a casing structure formed with an elongated slot for permitting the shift lever to move therethrough, the casing structure having an illuminating chamber defined therein, a light source located within said illuminating chamber and operative to emit light in the illuminating chamber, said casing structure including an indicator plate carrying thereon a mark indicative of said parking-gear position of said shift lever and a series of marks respectively indicative of the remaining positions of the shift lever, said indicator plate having a light pervious portion located in conjunction with the mark indicative of the parking-gear position of the shift lever and light pervious portions located respectively in conjunction with the marks indicative of said remaining positions of the shift lever, each of said marks being in the form of letters or numbers, and the light pervious portion located in conjunction with the mark indicative of the parking-gear position of the shift lever differing in configuration from said letters or numbers and from each of the remaining light pervious portions of said indicator plate, the light pervious portions located in conjunction with the marks indicative of said remaining positions of the shift lever being arranged in a predetermined relationship in said indicator plate and the light pervious portion located in conjunction with the mark indicative of the parking gear position of the shift lever being located unconformably to said relationship with respect to the reamining light pervious portions such that said remaining portions are disposed in a line and said light pervious portion located in conjunction with the mark indicative of the parking-gear position of the shift lever is offset from said line, said shift lever being pivotally movable about the center axis of a shaft such that said lever moves through said plurality of positions in a direction parallel to said line in which said remaining portions are disposed, and a pointer element secured to said shaft lever and movable in said illuminating chamber, the pointer element having a first light pervious portion movable between said light source and said light pervious portion located in conjunction with the mark indicative of the parking-gear position of the shift lever and a second light pervious portion movable between said light source and said remaining light pervious portions, the first and second light pervious portions differing in color from each other.

* * * * *